Figure 1:
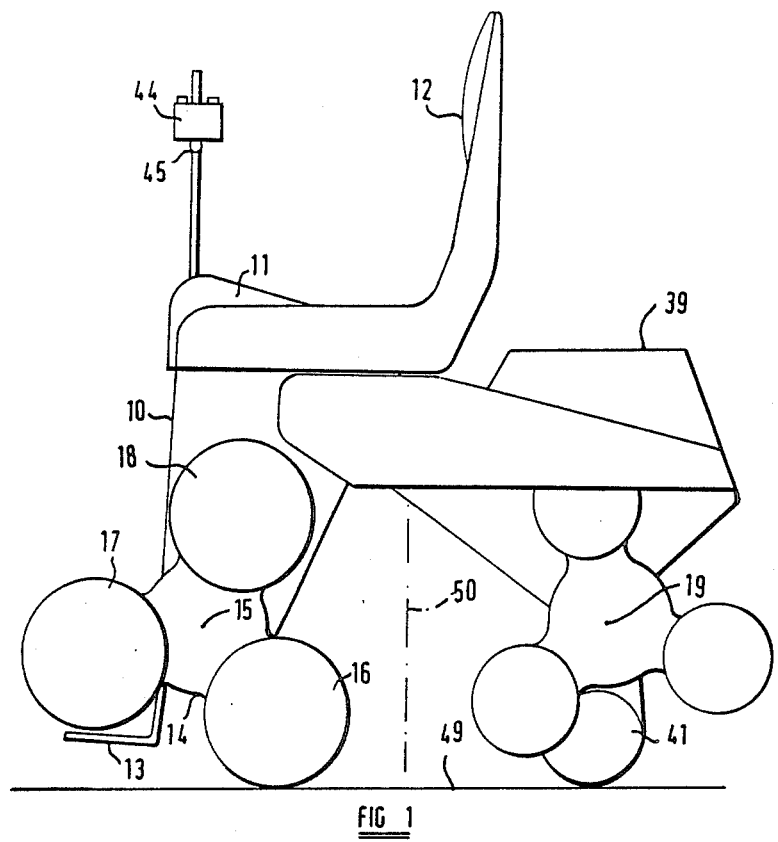

United States Patent [19]

Hester

[11] Patent Number: 4,794,999
[45] Date of Patent: Jan. 3, 1989

[54] WHEELCHAIR AND METHOD OF OPERATING SAME

[76] Inventor: Robert Hester, "Gretwyn" Haughton Drive, Shifnal, Shropshire, United Kingdom, TF11 8HF

[21] Appl. No.: 25,289

[22] PCT Filed: Jun. 25, 1986

[86] PCT No.: PCT/GB86/00367
§ 371 Date: Feb. 20, 1987
§ 102(e) Date: Feb. 20, 1987

[87] PCT Pub. No.: WO87/00040
PCT Pub. Date: Jan. 15, 1987

[30] Foreign Application Priority Data

Jun. 25, 1985 [GB] United Kingdom ............... 8515992

[51] Int. Cl.⁴ .............................................. B62B 9/06
[52] U.S. Cl. ................................. 180/8.2; 180/907; 280/5.26; 280/DIG. 10; 297/DIG. 4
[58] Field of Search ............... 280/DIG. 10, 242 WC, 280/656, 5.2, 5.26; 180/907, 6.5, 8.1, 8.2, 8.3; 297/DIG. 4

[56] References Cited

U.S. PATENT DOCUMENTS

| 2,742,973 | 4/1956 | Johannesen | 180/8.1 |
| 3,196,970 | 7/1965 | Brenner . | |
| 3,208,544 | 9/1965 | Colvin | 180/8.2 |
| 3,241,848 | 3/1966 | Flory . | |
| 3,283,839 | 11/1966 | Brown et al. . | |
| 3,348,518 | 10/1967 | Forsyth et al. | 180/8.2 |
| 4,421,189 | 12/1983 | Watkins et al. | 180/8.2 |
| 4,512,588 | 4/1985 | Cox | 180/8.2 |
| 4,613,151 | 9/1986 | Kielczewski | 180/907 |

FOREIGN PATENT DOCUMENTS 2165452 7/1973 Fed. Rep. of Germany .
2126540 2/1984 United Kingdom .

Primary Examiner—David M. Mitchell
Assistant Examiner—Everett G. Diederiks, Jr.
Attorney, Agent, or Firm—Parmelee, Miller, Welsh & Kratz

[57] ABSTRACT

A wheelchair is adjustable between a compact configuration, in which the center of gravity lies in a vertical plane (50), which intersects wheels (16,116) on a front carrier of the wheelchair and an extended configuration in which the center of gravity lies in a vertical plane spaced substantially from all wheels of the wheelchair.

8 Claims, 7 Drawing Sheets

WHEELCHAIR AND METHOD OF OPERATING SAME

In my published International patent application No. WO85/01206, corresponding to my U.S. Pat. No. 4,645,222 dated Feb. 24, 1987, I have disclosed a wheelchair capable of climbing a flight of stairs. The wheelchair comprises a frame, a seat on the frame, front and rear pairs of laterally spaced carriers, three wheels on each of the carriers and an arm pivoted on the frame, the rear carriers being mounted on the arm and rotatable relative thereto about a rear axis, the front carriers being mounted on the frame and relative thereto about a front axis, the front wheels being spaced apart around the front axis and the rear wheels being spaced apart around the rear axis. Drive means for driving the carriers about their respective axes includes means for pivoting the arm relative to the body in such a manner that driving of the rear carriers up the first two stairs of a flight of stairs, whilst the front carriers move a relatively short distance towards the bottom stair, causes the rear carriers to be pivoted upwardly relative to the frame so that the attitude of the seat is not changed unduly. For use on a level floor, there is provided a castor which is disposed between the front carriers and can be lowered into engagement with the floor, raising the wheels of the front carriers from the floor. The wheelchair is then propelled by driving wheels of the rear carriers.

An earlier proposal for a stair-climbing wheelchair is contained in U.S. Pat. No. 3,241,848 of Flory. The Flory wheelchair also has front and rear carriers, each carrying three wheels spaced apart around on axis of rotation of the respective carrier. As in the wheelchair disclosed in my own prior application, the rear carriers are supported by an arm which can pivot relative to the frame of the wheelchair to permit upward and donward movement of the rear carriers. Flory proposes hand-operated screw and nut mechanism for raising and lowering the rear carriers. Thus, there is no automatic raising and lowering of the rear carriers in accordance with differences between rotation of the front and rear carriers, as is provided in the wheelchair disclosed in my prior application.

From a first aspect, the present invention relates to a wheelchair, comprising a seat, front and rear pairs of laterally spaced carriers, a plurality of wheels on each carrier and drive means for driving at least some of said wheels, wherein the front carriers are mounted for turning relative to the seat about a front axis, the rear carriers are mounted for turning relative to the seat about a rear axis, the wheels on each front carrier are spaced apart around the front axis and the wheels on each rear carrier are spaced apart around the rear axis.

The wheelchair is preferably adjustable to vary the distance between the front and rear axes and the drive means may be arranged for effecting such adjustment in response to rotation of either the front carriers or the rear carriers relative to the other carriers. The drive means is preferably arranged for selectively turning the carriers of a first of the pairs about their axis relative to the seat independantly of the carriers of the second pair, such turning being accompanied by variation of the distance between the front and rear axes, or turning the carriers of both the first and second pairs together about respective axes relative to the seat, the spacing between the axes then remaining constant.

According to a second aspect of the invention, there is provided a method of operating a wheelchair according to the first aspect, wherein the wheelchair is turned whilst a respective wheel on each of the front carriers is engaged with the ground and the perpendicular line through the centre of gravity of the wheelchair, including the occupant, is near to, but is to the rear of, a straight line joining the positions where said wheels engage the ground and wherein the geometry of the wheelchair is then adjusted to move the perpendicular through the centre of gravity rearwardly away from said straight line.

During upward and downward movement of the rear carriers of the wheelchair described in the Flory specification and in the wheelchair described in my prior application, there will be a slight movement of the centre of gravity relative to the front axis. In each case, the rear carriers move through an arc, the chord to which is substantially vertical. At the middle of the arc, the rear carriers will be positioned slightly rearwards of the positions occupied at each end of the arc. Such slight rearwards movement of the rear carriers and parts which move with the rear carriers will affect the position of the centre of gravity of the wheelchair slightly but, in both the Flory wheelchair and in the wheelchair described in my prior application, movement of the centre of gravity is insignificant. Operation of a wheelchair in accordance with the second aspect of the present invention involves a more substantial movement of the centre of gravity.

I have discovered that substantial movement of the centre of gravity of a wheelchair is advantageous, for different conditions of use. Thus, when the wheelchair is required to be turned in a small turning circle, it is advantageous that the centre of gravity of the wheelchair and an occupant, considered as a single mass, should lie in a vertical plane which passes through or near to the positions at which driven wheels of the wheelchair rest on a floor. When traversing uneven ground and during climbing, it is desirable that the centre of gravity of the wheelchair and occupant should lie in a vertical plane which is spaced rearwardly from the wheels on the front carriers and forwardly from the wheels of the rear carriers. Thus, the arrangement is preferably such that the centre of gravity can be moved forwardly and rearwardly through a distance which is greater than the radius of the driven wheels (or, where the wheelchair includes driven wheels having respective different diameters, the radius of the smaller driven wheels) and preferably a distance which exceeds the diameter of these wheels. Thus, the centre of gravity may be movable between a vertical plane which is spaced rearwardly from the wheels of the front carriers, in all positions of the front carriers, and a vertical plane which intersects wheels of the front carriers.

References herein to a vertical plane are references to a vertical plane with the wheelchair resting on a horizontal floor.

The wheelchair disclosed in my prior International application has a castor disposed centrally between the front carriers and a screw and nut mechanism, whereby the castor can be raised clear of the ground, in which case the wheelchair rests on wheels of the front carriers, or lowered to bear on the ground and raise the wheels of the front carriers clear of the ground. A handle is provided to enable the occupant of the wheelchair to operate the screw and nut mechanism.

A wheelchair in accordance with the present invention preferably includes a wheel additional to the wheels on the front and rear carriers but arranged other than in the manner described in my prior application. Such additional wheel is called herein a mid-wheel. It will be understood that a pair of mid-wheels, arranged near to each other and to move together, may be provided. Reference to a mid-wheel is not intended to exclude the provision of a pair of mid-wheels.

The mid-wheel is preferably arranged for pivoting relative to the remainder of the wheelchair about a generally upright axis and may be arranged to have a castor action.

The mid-wheel is preferably positioned nearer to the rear carriers than to the front carriers. The mid-wheel is preferably so associated with the rear carriers that the mid-wheel is moved relative to the front axis when the rear axis is moved relative to the front axis. The mid-wheel may be so arranged that, in one configuration of the wheelchair, it engages a floor to the rear of a vertical plane containing the rear axis and, in another configuration of the wheelchair, it engages the floor forwards of a vertical plane containing the rear axis.

The drive mleans of the wheelchair preferably includes means defining a plurality of alternative configurations of the wheelchair and is preferably arranged for establishing automatically any selected one of these pre-defined configurations. The configurations may include two or more of:

A first configuration, in which the carriers of one pair are set so that, when the wheelchair runs on a smooth, horizontal floor, one wheel only on each of these carriers rests on the ground. These carriers are preferably the front carriers. In the first configuration, further wheels on the front carriers are preferably spaced forwardly and upwardly from the wheels which rest on the ground.

A second configuration, in which two wheels on each of the front carriers rest on the ground.

A third configuration in which the carriers of one said pair are set so that one wheel on each of these carriers contacts the ground at a position directly beneath the axis of the one pair of carriers.

A fourth configuration in which respective wheels on all of the carriers and the mid-wheel engage the ground. It is preferred that, in the fourth configuration, two wheels on each carrier of at least one of the pairs of carriers engage the ground.

The drive means may be capable of restraining rotation of the carriers about their axes whilst two or more of the wheels are driven. Driving of two or more wheels whilst rotation of all of the carriers is restrained is called herein operation in a normal mode.

The wheelchair is preferably operable also in a climbing mode, in which the drive means is operable to rotate all of the carriers about their respective axes and concurrently to drive at least two wheels independently of rotation of the carriers. This mode may be used on uneven ground. When the climbing mode is used for climbing a flight of stairs, the wheels are preferably driven in a direction to move the wheelchair towards risers of the stairs, irrespective of whether the wheelchair is climbing up the stairs or climbing down the stairs.

In the climbing mode, driving of the wheels is preferably less than driving of the wheels in normal travel on a horizontal floor. The driving of the wheels may be intermittent, for example the motor which drives the wheels being pulsed, rather than energised continuously.

According to a further aspect of the invention, there is provided a method of operating a wheelchair according to the first aspect, wherein the carriers of the wheelchair are driven during use of the wheelchair on a generally horizontal surface. The carriers of one pair of carriers may be drivento adjust the configuration of the wheelchair. Alternatively, the carriers of both pairs may be driven to advance the wheelchair over uneven ground.

In the preferred method, driving of the carriers of one pair without driving of the carriers of the other pair automatically adjusts the spacing between the front and rear axes of the wheelchair, so that the wheelchair is extended or contracted.

Figure 2:
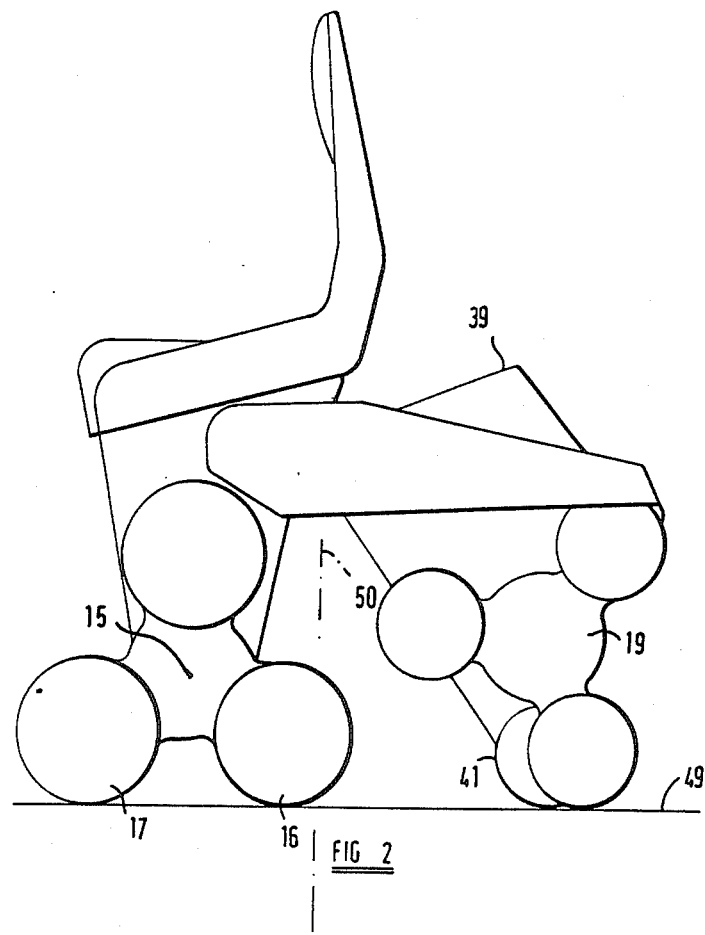
Figure 3:
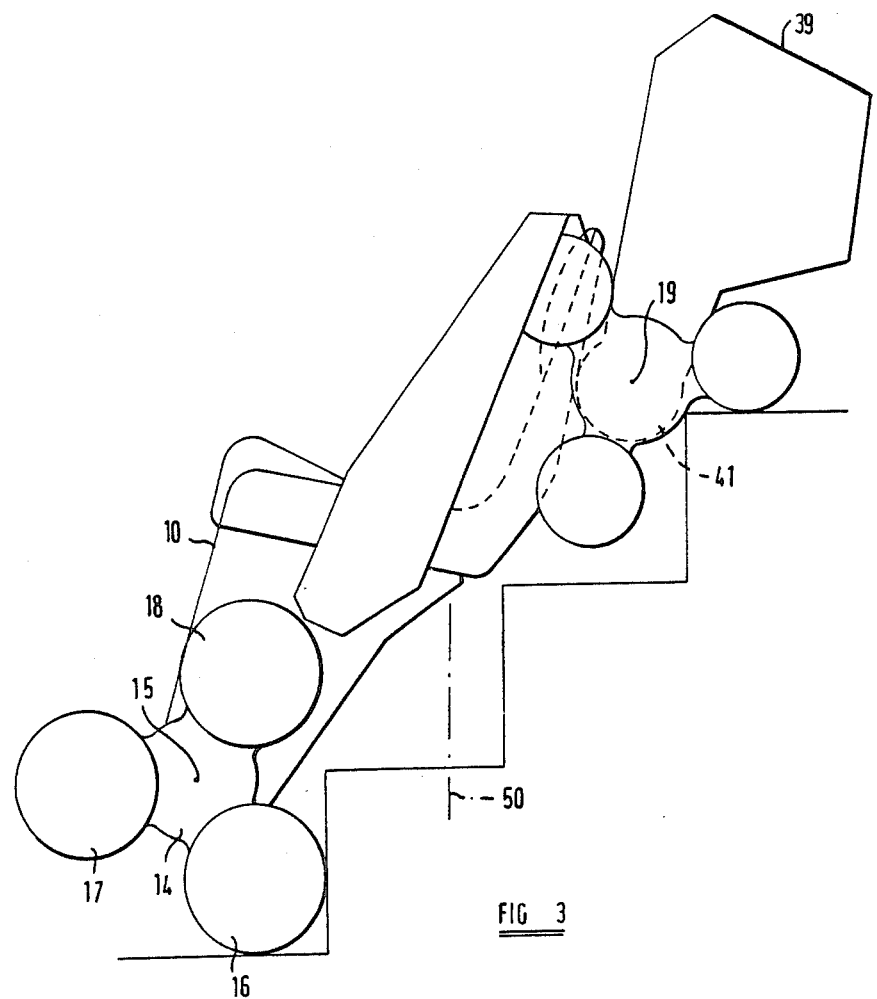
Figure 4:
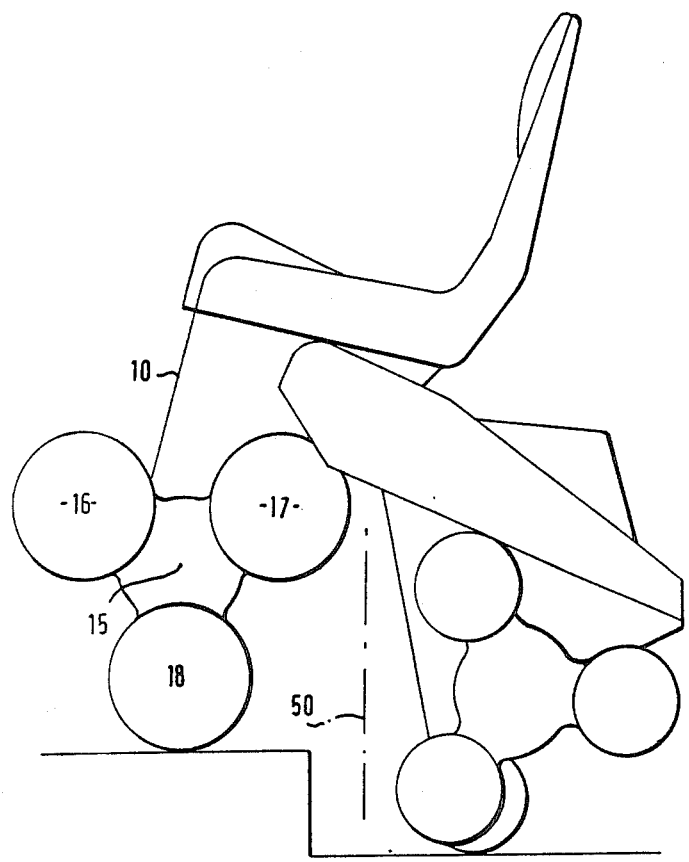
Figure 5:
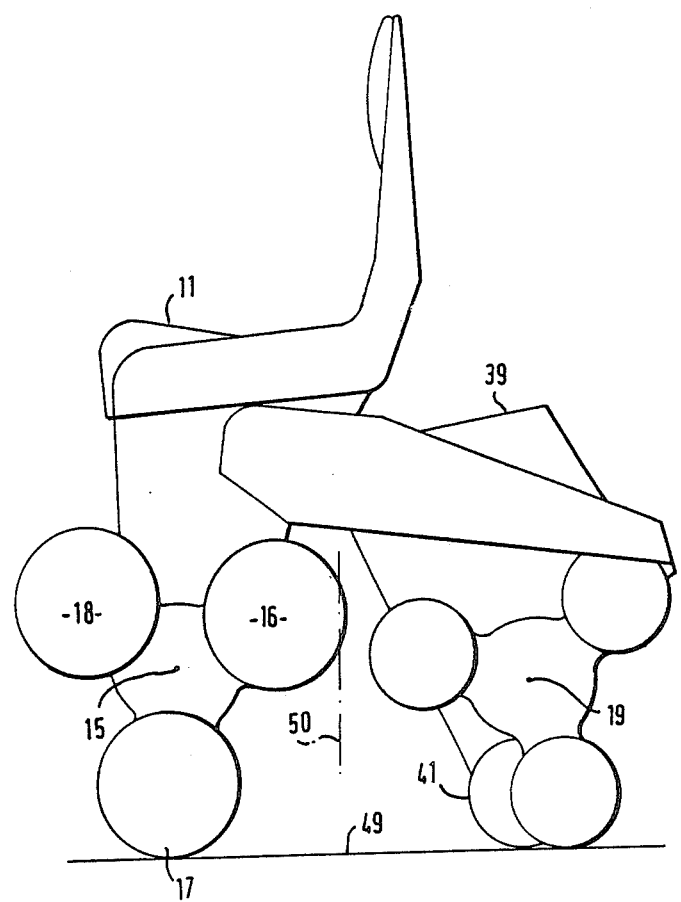
Figure 6:
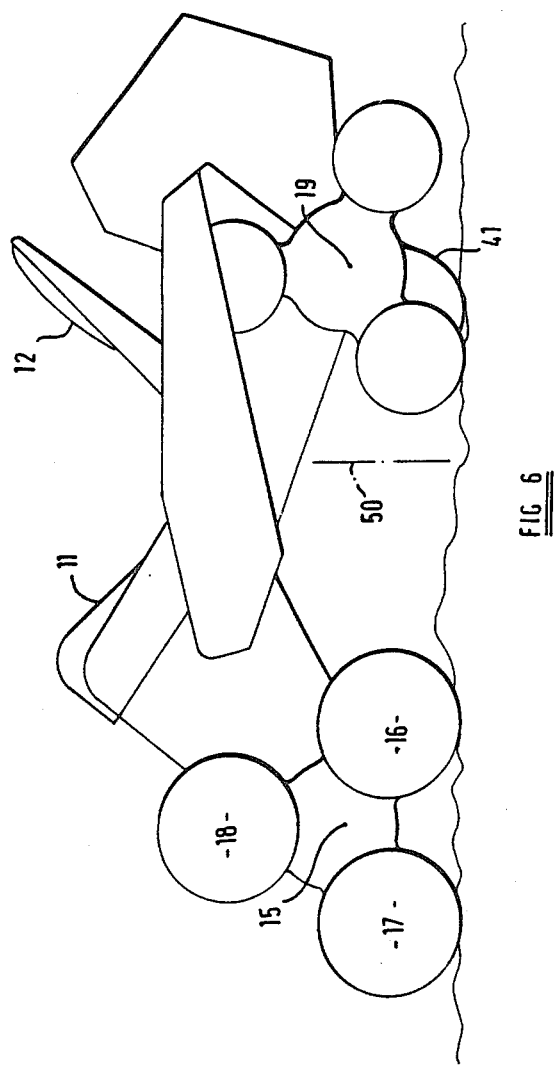
Figure 7:
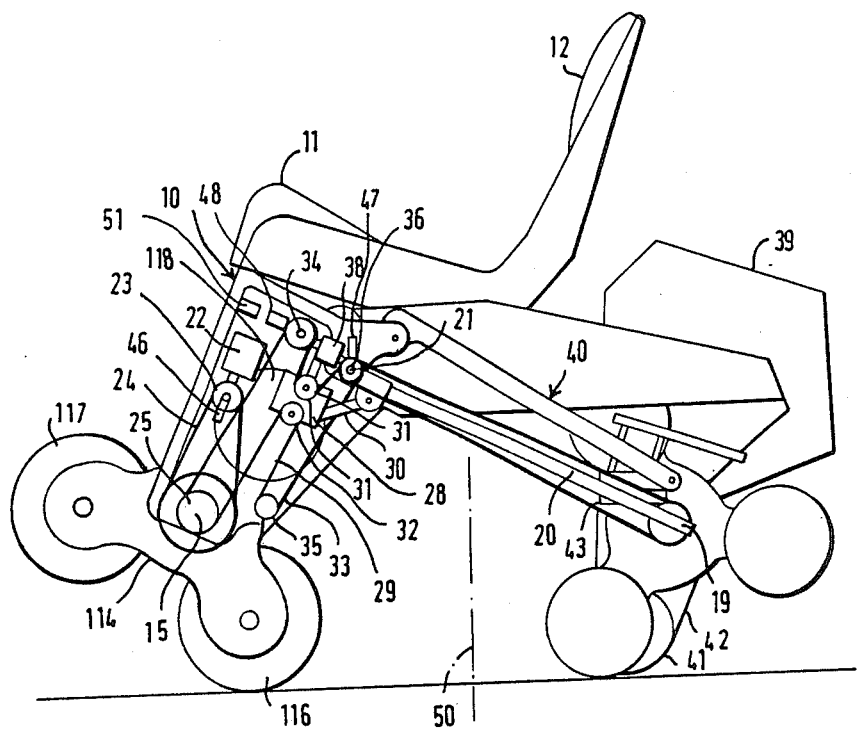

An example of a wheelchair embodying the present invention and which is used in a method in accordance with the present invention will now be described, with reference to the accompanying drawings, wherein:

FIG. 1 shows the wheelchair diagrammatically in its normal configuration, for use in a normal mode, FIG. 2 shows the wheelchair diagrammatically in a contracted configuration, FIG. 3 shows the wheelchair diagrammatically in a climbing mode, FIG. 4 shows the wheelchair diagrammatically during climbing of a kerb, FIG. 5 shows the wheelchair diagrammatically in an elevated configuration, FIG. 6 shows the wheelchair diagrammatically in an extended configuration, and FIG. 7 shows the wheelchair in a partly extended configuration and with certain parts broken away to reveal internal parts of the wheelchair.

The general configuration of the wheelchair illustrated in the accompanying drawings is similar to that of the wheelchair described and illustrated in U.S. Pat. No. 4,645,222. The wheelchair comprises a body 10 including a seat cushion 11, a back rest 12 and folding foot rests 13 for an occupant.

At the left-hand side of the body 10, there is provided a front, left-hand carrier 14 which is mounted for rotation relative to the body about a normally horizontal axis 15 which extends laterally of the wheelchair. A corresponding carrier is provided at the right-hand side of the body for rotation with the carrier 14 about the axis 15. The front, right-hand carrier is indicated by the reference numeral 114 in FIG. 7. Three wheels 16,17 and 18 are mounted on the carrier 14 for rotation relative thereto about respective axes which are parallel to the axis 15. The wheels 16, 17 and 18 are spaced apart about the axis 15 so that either one or two of these wheels can rest on the ground at any one time. Three corresponding wheels 116, 117 and 118 are provided on the front, right-hand carrier.

The wheelchair also includes a pair of laterally spaced rear carriers mounted for rotation relative to the body 10 about a rear axis 19 on a member 20. Each of the rear carriers carries three wheels arranged in the same manner as are the wheels 16, 17 and 18 on the carrier 14. The member 20 is connected with the body 10 for pivoting relative thereto about an axis 21 which is parallel to the axis 15.

The wheelchair includes a drive means for pivoting the member 20 relative to the body 10, driving the front and rear carriers and for driving the wheels of the front carriers. In the example illustrated, the drive means includes a pair of electrically energisable running motors, one of which is shown at 22, for driving respectively the wheels on the front left-hand carrier and the wheels on the front right-hand carrier. Control means is provided for controlling the direction in which and the speed at which the front wheels are driven. For normal running in a straight line, the left-hand and right-hand wheels are driven at the same speed. If a speed differential is established, the wheelchair can be turned around a corner. The running motors are disposed beneath the seat cushion 11 and are fixed with respect to the body 10. The running motors incorporate brakes, whereby rotation of the wheels on the front carriers can be restrained.

Each running motor 22 has an output shaft arranged to drive via a chain and sprocket drive 23, 24 or a gear train a lower sprocket 25 arranged for rotation about the front axis 15. For each of the front wheels, there is provided a respective gear train 26 or a chain which transmist drive from the lower sprocket to the wheel concerned. Chain and sprocket drives or gear trains useful in connection with the invention are further described in U.S. Pat. No. 4,645,222.

The drive means further comprises an electrically energisable lift motor 27 which is also disposed below the seat cushion 11 and is fixed with respect to the body 10. With the lift motor, there is associated transmission means as described in U.S. Pat. No. 4,645,22 for transmitting drive to the front carriers or to the rear carriers or both. With this transmission means, there is associated positioning means linked mechanically to the member 20 at a position spaced from the axis 21 and displaceable relative to the body 10 when either the front carriers or the rear carriers rotate withiut rotation of the other carriers occurring or when there is a difference between rotation of the front carriers and rotation of the rear carriers. This arrangement provides that the member 20 is pivoted relative to the body 10 in a manner dependant upon the relation between rotation of the front carriers and rotation of the rear carriers as described in U.S. Pat. No. 4,465,222.

With the lift motor 27, there is associated an electromagnetic clutch assembly 38 through which drive can be transmitted from the lift motor either to the front shaft 34 or the rear shaft 36 or to both of these shafts concurrently.

The positioning means includes a respective slide 28 adjacent to each side of the body 10 and arranged for sliding along a respective guide 29. A pivoted strut 30 extends from the slide 28 to the member 20. Upper and lower sprockets 31 and 32 are mounted on the slide 28 for free rotation relative thereto. An endless chain 33 extends from the sprocket 31 over a sprocket on a front shaft 34, around a sprocket fixed to the front carrier 14, around the sprocket 32, around a sprocket 35 mounted on the body 10 adjacent to a lower end of the guide 29, around a sprocket on a rear shaft 36 and back to the sprocket 31.

A corresponding arrangement of chain and sprockets is provided adjacent to the other side of the body 10. The front and rear shafts 34 and 36 extend across th wheelchair and each carry a sprocket over which an endless chain 33 runs and a further sprocket over which the other chain runs. The rear shaft 36 is connected with the rear carriers by a further chain and sprocket drive 37.

The wheelchair further comprises a power source which is typically a battery of lead-acid secondary cells in a housing 39. The power source is connected with the body 10 by the member 20 and by a linkage 40 which controls tipping of the power source relative to the member 20 and acts to prevent unacceptably large changes in the orientation of the power source, such as would previously impair operation of a battery.

A pair of mid-wheels 41 is mounted fairly close together on a common axle carried by a rocker 42 arranged for limited rocking about a horizontal axis on a support 43. The support 43 is mounted for swivelling about a generally upright axis on a beam which is fixed to the member 20. The axle of the mid-wheels is horizontal and the rocker can rock about an axis which is parallel to and which lies above the axle. Thus, the wheels can undergo a castor action and will trail when the wheelchair is driven along a floor.

By pivoting of the member 20 relative to the body 10, the separation between the front and rear axes 15 and 19 can be varied. It will be noted that the support 43 for the mid-wheels and the power source 39 move with the rear axis relative to the front axis and body 10.

The wheelchair includes control means comprising a control unit 44 mounted on an arm 45 which is pivoted to the body 10 near to a front corner of the seat cushion 11. The control unit can be positioned above a front part of the seat cushion, once a user has occupied the seat. The control unit incorporates a microprocessor for controlling operation of the wheelchair in accordance with instructions fed into the control unit by operation of a joystick and various buttons on the control unit. The control means further comprises a transducer 46 for providing to the microprocessor an electrical signal representing rotation of the output shaft of the running motor 22, a second transducer 47 for providing to the microprocesser an electrical signal representing angular movement of the arm 20 and a third transducer 48 associated with the front shaft 34, for supplying to the microprocessor an electrical signal representing angular movement of the front carrier 14 about the axis 15. From information representing the angular position of the front carrier and the angular position of the member 20, the microprocessor is able to compute the angular position of the rear carriers about the axis 19.

The microprocessor is programmed to establish any selected one of a plurality of alternative configurations of the wheelchair automatically, upon operation of a corresponding switch.

A first of these configurations is illustrated in FIG. 1. This configuration is designated a normal configuration and is used for normal travel of the wheelchair on floors and other horizontal, fairly smooth surfaces. In the normal configuration, the front wheel 16 is engaged with the ground at a position somewhat to the rear of the vertical plane containing the front axis 15 and the wheel 17 is positioned forwardly of the axis and at a level slightly higher than that of the wheel 16. The gap between the floor 49 and the wheel 17 is somewhat exaggerated in FIG. 1. For forward running in the normal configuration, both running motors are energised continuously and all of the wheels 16 to 18 and 116 to 118 are driven. If the wheels are all driven at the same speed, the wheelchair travels along a straight path. The wheelchair can be driven in a reverse direction by driving the front wheels in the opposite direction. Forward and reverse movement are selected by moving the joystick of the control unit 44 forwardly or rearwardly. If the joystick is moved to one side, the microprocessor establishes a difference between the respective speeds of the running motors. If the joystick is forward of its central position, so that the wheelchair is travelling forwardly, then the wheelchair follows a curved path. Similarly, if the joystick is rearwards of its central position, the wheelchair will follow a curved path, travelling backwards. If the joystick is moved sideways from its central position, the wheels on one front carrier will be driven in one direction whilst the wheels on the other front carrier are driven in the opposite direction and the wheelchair will turn withoiut travelling significantly either forwards or backwards.

In the normal configuration of the wheelchair, the mid-wheels 41 rest on the floor 49 and the wheels of the rear carriers are clear of the floor. It will be noted that one wheel of each rear carrier is spaced upwardly and rearwardly from the mid-wheels and a further wheel on each rear carrier is spaced only a short distance above the ground, at a position slightly forward from the position where the mid-wheels contact the ground. In the event of the wheelchair rocking sideways on its mid-wheels, one or other of the rear wheels will come into contact with the ground and limit such rocking. Furthermore, in the event of the wheelchair tipping forwardly, the wheels 17 and 117 will engage the ground and limit such tipping.

The position of the centre of gravity of the occupant and wheelchair, considered as a single mass, depends somewhat upon the stature of the occupant and the position he occupies on the seat. However, in the normal configuration of the wheelchair, the centre of gravity will lie in a vertical plane 50 which is spaced rearwardly from the wheels of the front carriers and forwardly from the wheels of the rear carriers. This plane will be nearer to the positions at which the wheels 16 and 116 contact the ground than to the position at which the mid-wheels 41 contact the ground.

A second configuration of the wheelchair, which is a compact configuration, is illustrated in FIG. 2. In this configuration, both of the wheels 16 and 17 and both of the wheels 116 and 117 are engaged with the floor 49. The rear axis 19 and the power source 39 are somewhat closer to the front axis 15 than they are in the normal configuration and the plane 50 containing the centre of gravity of the wheelchair and occupant intersects the wheels 16 and 116. Accordingly, the load borne by the wheels 16 and 116 is somewhat greater than the load borne by the wheels 17 and 117. Also in the compact configuration, the mid-wheels 41 are engaged with the ground and the lowermost wheels on the rear carriers are just clear of the ground. The rearwards projection of the rearwheels from the rear axis 19 is or is near to a minimum projection. The wheels 16 and 17 lie at opposite sides of a vertical plane containing the axis 15.

The compact configuration is attained from the normal configuration by turning the front carriers and turning the rear carriers but through an angle different from that through which the front carriers are turned. Turning of the carriers is controlled by the microprocessor, following pressing of the appropriate button on the control unit 44. Once the compact configuration has been attained, further turning of the carriers is prevented by the control means.

When in the compact configuration, the wheelchair can be turned within a small spaced, by driving the wheels of one front carrier forwardly and the wheels of the other front carrier rearwardly. There will be some scuffing of the foremost wheels during such turning but driving of the front wheels ensures that sliding friction, rather than static friction, opposes turning movement. Engagement of the foremost wheels with the floor 49 contributes significantly to stability of the wheelchair and prevents the wheelchair toppling forward, notwithstanding that the centre of gravity is nearer to the front of the wheelchair than to the rear of the wheelchair.

A third configuration is illustrated in FIG. 3. This is an extended configuration adopted in the climbing mode of operation of the wheelchair. FIG. 3 illustrates the wheelchair with a wheel of each front carrier resting on the floor adjacent to the flight of stairs and a wheel of each rear carrier engaged with a third tread of the flight stairs. The vertical plane 50 containing the centre of gravity of the occupant and wheelchair passes between the front and rear carriers and is spaced from both the front wheels and the rear wheels. Accordingly, there is no risk of the wheelchair toppling forwards.

The configuration illustrated in FIG. 3 is attained from the normal configuration by reversing the wheelchair upto the bottom riser of the flight of stairs and then, by pressing an appropriate button on the control unit 44, instructing the microprocessor to adopt the climbing mode. Intermittent drive is applied to the wheels of the front carriers by pulsing both running motors so that the wheelchair is urged backwards. Drive from the lift motor 27 is applied to the rear shaft 36 only, the front shaft 34 being braked. The rear carriers are turned together so that they rotate about the centres of the wheels engaged with the lowermost riser until a further rear wheel bears on the first tread of the stairs. Continued turning of the rear carriers allows the wheelchair to be moved backwards by the running motors until wheels of the rear carriers are engaged wih the second riser of the stairs. Such rotation of the rear carriers is accompanied by pivoting of the arm 20 relative to the body 10 so that the rear carriers move upwards and the attitude of the seat is not unduly changed.

When the microprocessor is informed by the transducer 47 that the wheelchair is fully extended, drive is applied from the lift motor 27 to both the front shaft 34 and the rear shaft 36. The wheels on the front carriers and the wheels on the rear carriers then roll up respective steps. Owing to continued application of rearwards drive from the running motors to the wheels of the front carriers, a wheel of each front carrier is always urged towards a riser of the stairs, so that the front wheels cannot roll off the edge of a tread. When a wheel of elach rear carrier has reached the top of the flight of stairs, that wheel can roll rearwards withiut interruption and a further wheel of each rear carrier rolls onto the horizontal surface at the top of the flight of stairs. Rotation of the rear carriers then ceases and rotation of the front carriers is continued, thereby causing the arm 20 to swing downwardly and forwardly relative to the body 10 until the wheelchair has been contracted and all wheels have left the flight of stairs. The appropriate switch is then operated to re-establish the normal configuration.

The climbing mode is also selected for descent of a flight of stairs. In this case, drive is initially applied from the lift motor 27 only to the front carriers to cause wheels of the front carriers to roll down the uppermost riser and then down successive risers. During this initial movement of the front carriers, the rear carriers do not turn and the member 20 is therefore pivoted relative to the body 10 to raise the rear carriers. This maintains the attitude of the seat at least approximately constant. When the wheelchair has been extended, drive is applied from the lift motor to both front and rear carriers. As in use of the climbing mode for ascending a flight of stairs, the running motors are pulsed to drive the wheels of the front carriers rearwards whilst the front carriers are descending the flight of stairs. In this way, a wheel of each front carrier is maintained in contact with a corresponding riser of the stairs and rolling of the front wheels off the front edge of a tread is avoided.

Driving of both the front and rear carriers is also used for climbing over a kerb or other isolated obstuction, as illustrated in FIG. 4. Such use of the wheelchair is termed use in the walking mode. In the walking mode, drive is applied from the lift motor 27 to both the front and rear carriers. Accordingly, whilst some pivoting of the member 20 relative to the body 10 will occur when wheels of the carriers roll up the kerb or other obstruction, the wheelchair will be neither fully contracted not fully extended. Indeed, the microprocessor is preferably programmed to ensure that operation in the walking mode cannot continue if the wheelchair becomes contracted to a degree greater than the degree of contraction in the normal configuration. This limitation is to avoid risk of loss of stability. The walking mode also differs from the climbing mode in that the running motors are not energised to drive the front wheels rearwards. Accordingly, the wheelchair is able to travel forwardly up a kerb in the walking mode. Alternatively, the carriers may be driven in the reverse direction to cause the wheelchair to travel backwards, in the walking mode. Preferably, rotation of the front wheels is restrained, when the wheelchair is operated in the walking mode.

When the wheelchair is used in the walking mode, the centre of gravity of the occupant and wheelchair lies in a vertical plane which passes between the positions at which front wheels engage the ground and positions at which rear wheels engage the ground.

A further configuration of the wheelchair is illustrated in FIG. 5. This configuration is called the elevated configuratiin. The microprocessor is instructed to establish the elevated configuration by operation of an appropriate switch in the control unit 44. The elevated configuration is attained by applying drive from the lift motor 27 to the front and rear carriers, in turn, whilst rotation of the front wheels is restrained. In the elevated configuration, the wheel 17 engages the floor 49 at a position which is directly below or almost directly below the front axis 15. The wheels 16 and 18 are at approximately the same level, both being above the level of the uppermost part of the wheel 17. Similarly, one wheel of each rear carrier is lowermost and the other two wheels of that rear carrier lie entirely above the level of the uppermost part of that one wheel. The lowermost wheel on each rear carrier engages the floor 49 and the mid-wheels 41 may be just clear of the floor.

When the configuration of the wheelchair is changed from the normal configuration to the elevated configuration, the seat cushion 11 is raised significantly and is caused to adopt a substantially horizontal attitude. It will be noted that, in the normal configuration, the seat cushion is inclined downwardly and rearwardly somewhat. When the wheelchair is in the elevated configuration, the vertical plane containing the centre of gravity of the occupant and wheelchair lies approximately midway between the front and rear axes 15 and 19. Adoption of the elevated configuration raises the occupant to a level convenient for working out at a table or desk.

By operation of an appropriate switch in the control unit 44, the occupant of the wheelchair can instruct the microprocessor to establish a lowered configuration illustrated in FIG. 6. In this configuration, the spacing between the front and rear axes 15 and 19 is much greater than in the normal configuration. Accordingly, the seat cushion 11 is inclined rearwardly and downwardly to a greater degree than in the normal configuration and the backrest 12 also is inclined. Two wheels of each front carrier rest on the ground, so that the front axis 15 is as low as possible. The rear axis 18 also is relatively low, at least one and, possibly, two of the wheels associated with each rear carrier also resting on the ground. As shown, the mid-wheels 41 also may contact the ground. Thus, the load is distributed over a large number of wheels and no single wheel engages the ground under excessive pressure. This reduces the risk of any wheel sinking into soft ground.

When the wheelchair is in the lowered configuration, the occupant is nearer to the ground than when the wheelchair is in the normal configuration. Furthermore, the centre of gravity of the occupant and wheelchair lies in a vertical plane which is spaced rearwardly a substantial distance from the wheels of the front carriers and is spaced forwardly from the wheels of the rear carriers. With wheels of both the front and rear carriers engaged with the ground, the stability of the wheelchair is good and the occupant can safely lean out from his seat and otherwise shift his weight, without risk of overturning the wheelchair.

If FIGS. 2 and 6 are compared, it can be seen that the centre of gravity can be moved a considerable distance towards and away from the front axis 15 by extension and contraction of the wheelchair. Extension provides increased stability and contraction provides increased manoeuvrability.

A still further configuration of the wheelchair is illustrated in FIG. 7, where the backrest 12 is somewhat inclined to the vertical, the seat cushion 11 is inclined downwardly and rearwardly and the centre of gravity lies in a plane which is spaced rearwards from all wheels of the front carriers. The degree of extension of the wheelchair is intermediate that in the normal configuration and that in the lowered configuration.

For travel along a rectilinear path at a relatively high speed, for example 7 km/hr, the wheelchair can be set in a configuration intermediate those shown in FIGS. 1 and 7. In this intermediate configuration, two wheels of each front carrier and two wheels of each rear carrier rest on the floor. Furthermore, the centre of gravity lies in a plane which is spaced rearwards from the wheels of the front carriers. The ability of the wheelchair follow a curved path is seriously impaired. The occupant will be unable to cause the wheelchair to turn round an abrupt corner. For operation of the wheelchair at maximum speed, the fast mode is selected by operation of a corresponding switch in the control in the control unit 44. In the fast mode, the wheelchair will respond to forward and rearward movement of the joystick. If the joystick is returned to its central position, the brakes of the wheelchair are applied after a delay which permits the wheelchair to slow down or come to a rest, before the brakes are applied. It will be understood that abrupt braking of the front wheels whilst the wheelchair is travelling at its maximum speed would be potentially dangerous. When the wheelchair is operating in its normal mode, return of the joystick to the central position causes the front wheels to be braked immediately.

The control means includes a tilt sensor 51 responsive to tilting of the body 10 a predetermined angle relative to the horizontal in the forwards direction or to tilting of the body 10 through a further predetermined angle relative to the horizontal rearwards. When the limit of forward or rearward tilting is reached, the microprocessor is alerted by the tilt sensor and the microprocessor interrupts operation of the wheelchair to avoid further tilting. Intervention by the occupant of the chair can then bring about operation to reduce the degree of tilt, but not to increase tilting of the wheelchair.

When the climbing mode is selected, there can be selected one of two or more variations of the climbing mode which differ in respect of the angle through which the member 20 is pivoted before drive is applied from the lift motor 27 to both the front and rear carriers. These alternatives adapt the wheelchair to flights of stairs having respective different pitches. During operation of the wheelchair in the climbing mode, rotation of the output shafts of the running motors is sensed by the transducer 46. In the event of failure of one of these motors, and consequent lack of rotation of the output shaft of that running motor, whilst the lift motor 27 is running, the microprocessor is alerted and driving of the carriers in a direction to cause the wheelchair to descend the stairs is prevented.

The features disclosed in the foregoing description, or the accompanying drawings, expressed in their specific forms or in terms of a means for performing the disclosed function, or a method or process for attaining the disclosed result, as appropriate, may, separately or any combination of such features, be utilised for realising the invention in diverse forms thereof.

I claim:

1. A wheelchair comprising a seat, front and rear parts of laterally spaced carriers, a plurality of wheels on each carrier, drive means for driving the carriers and at least some of said wheels, and control means for operating the drive means, wherein the front carriers are mounted for turning relative to the seat about a front axis, the rear carriers are mounted for turning relative to the seat about a rear axis, the wheels on each front carrier are spaced apart around the front axis, the wheels on each rear carrier are spaced apart around the rear axis, the rear axis is movable upwardly and downwardly relative to the front axis and to the seat, the drive means is arranged for driving said carriers about respective ones of the front and rear axes, the drive means includes means defining a plurality of alternative predetermined configurations of the wheelchair and is arranged for setting the carriers automatically in any selected one of said predetermined configurations, one of said configurations is a compact configuration, another of said predetermined configurations is an extended configuration, in the compact configuration with the wheelchair resting on a horizontal floor, at least one of said wheels on each of said front carriers engages the floor and intersects a vertical plane containing the centre of gravity of the wheelchair and, in the extended configuration of the wheelchair, with the wheelchair resting on the horizontal floor, the centre of gravity lies in a vertical plane spaced from all of said wheels on the front and rear carriers, and the control means includes a microprocessor, means for feeding instructions to said microprocessor for controlling the front and rear carriers and wheels, and the configuration of the wheelchair, and a plurality of transducers for providing electrical signals to the microprocessor to enable the microprocessor to determine the angular positions of the front and rear carriers.

2. A wheelchair according to claim 1, wherein the drive means is arranged for driving the wheels which are on the front carriers, the wheelchair further comprises a mid-wheel mounted for swivelling with a castoring action about a swivelling axis, wherein, when the wheelchair is in the compact configuration and is resting on a horizontal floor, the swivelling axis is generally upright and the mid-wheel engages the floor at a position forwards of at least one wheel on each rear carrier, wherein means is provided for automatically varying the distance between the mid-wheel and the front axis when the distance between the front and rear axes is varied and wherein the centre of gravity of the wheelchair moves substantially relative to both the front and rear axes when the distance between these axes is varied.

3. A wheelchair according to claim 2 further comprising a power source and a linkage for controlling movement of the power source relative to the seat, wherein, with the wheelchair resting on a horizontal floor in the compact configuration, the power source is spaced downwardly and rearwardly from the seat and wherein, with the wheelchair resting on a horizontal floor in the extended configuration, the power source is spaced rearwardly from the seat.

4. A wheelchair according to claim 1 wherein the compact configuration is one in which the separation between the front and rear axes is not substantially greater than the sum of the distance from the front axis to one of the front wheels and the diameter of that wheel, the extended configuration is one in which the separation between the front and rear axes is at least approximately equal to three times the sum of the distance between the front axis and one of the front wheels and the diameter of that wheel and wherein said alternative predetermined configurations include at least one further configuration selected from the group comprising:

a first predetermined configuration in which the carriers of one pair are set so that, when the carrier runs on a smooth, horizontal floor, one wheel only of each of these carriers rests on the floor;

a second predetermined configuration in which a respective wheel of each of the carriers rests on the ground at a position approximately directly beneath the axis of rotation of the corresponding carriers; and a third predetermined configuration in which a foremost pair of wheels of the wheelchair are spaced from the ground by a distance not exceeding the radius of those wheels and a rearmost pair of wheels are spaced from the ground by a distance not exceeding the diameter of those wheels.

5. A wheelchair according to claim 1 wherein the compact configuration is one in which the separation between the front and rear axes is not substantially greater than the sum of the distance from the front axis to one of the front wheels and the diameter of that wheel, the extended configuration is one in which the separation between the front and rear axes is at least approximately equal to three times the sum of the distance from the front axis to one of the front wheels and the diameter of that wheel and wherein said alternative configurations include at least two further configurations selected from the group comprising:

a first configuration in which the carriers of one pair are set so that, when the wheelchair runs on a smooth, horizontal floor, one wheel only of each of these carriers rests on the floor;

a second configuration in which a respective wheel of each of the carriers rests on the ground at a position approximately directly beneath the axis of rotation of the corresponding carrier, and a third configuration in which a foremost pair of wheels of the wheelchair are spaced from the ground by a distance not exceeding the radius of those wheels and a rearmost pair of wheels are spaced from the ground by a distance not exceeding the diameter of those wheels.

6. A wheelchair according to claim 1 wherein the compact configuration is one in which the separation between the front and rear axis is not substantially greater than the sum of the distance from the front axis to one of the front wheels and the diameter of that wheel, the extended configuration is one in which the separation between the front and rear axis is at least approximately equal to three times the sum of the distance from the front axis to one of the front wheels and the diameter of that wheel and wherein said alternative configurations include each of the three configurations of the group comprising:

a first configuration in which the carriers of one pair offset so that, when the wheelchair runs on a smooth, horizontal floor, one wheel only of each of these carriers rests on the floor;

a second configuration in which a respective wheel of each of the carriers rests on the ground at a position approximately directly beneath the axis of rotation of the corresponding carrier; and a third configuration in which a foremost pair of wheels of the wheelchair are spaced from the ground by a distance not exceeding the radius of those wheels and a rearmost pair of wheels are spaced from the ground by a distance not exceeding the diameter of those wheels.

7. A method of operating a wheelchair comprising a seat, front and rear pairs of laterally spaced carriers, a plurality of wheels on each carrier, drive means for driving at least some of said wheels, and control means for operating the drive means, wherein the control means includes a microprocessor, means for feeding instructions to said microprocessor for controlling the front and rear carriers and wheels and the configuration of the wheelchair, and a plurality of transducers for providing electrical signals to the microprocessor to enable the microprocessor to determine the angular positions of the front and rear carriers and the control means is operated to cause said drive means to define one of a plurality of alternative predetermined configurations of the wheelchair and set the carriers automatically in any one of said predetermined configurations, one of said configurations is a compact configuration, another of said predetermined configurations is an extended configuration, in the compact configuration with the wheelchair resting on a horizontal floor, at least one of said wheels on each of said front carriers engages the floor and intersects a vertical plane containing the centre of gravity of the wheelchair and, in the extended configuration of the wheelchair, with the wheelchair resting on the horizontal floor, the centre of gravity lies in a vertical plane spaced from all of said wheels on the front and rear carriers and in the extended configuration, the attitude of the seat of the wheelchair is not parallel to the floor, and wherein the wheelchair is turned in the compact configuration whilst a respective wheel on each of the front carriers is engaged with the ground and the perpendicular line through the centre of gravity of the wheelchair, including the occupant, is near to, but is to the rear of, a straight line joining the positions where said wheels engage the ground and the geometry of the wheelchair is then adjusted to move the perpendicular line through the centre of gravity rearwardly away from said straight line.

8. A wheelchair comprising a seat, front and rear pairs of laterally spaced carriers, a plurality of wheels on each carrier, drive means for driving at least some of said wheels, and control means for operating the drive means, wherein, the front carriers are mounted for turning relative to the seat about a front axis, the rear carriers are mounted for turning relative to the seat about a rear axis, the wheels on each front carrier are spaced apart around the front axis, the wheels on each rear carrier are spaced apart around the rear axis, wherein the drive means includes wheel-driving motor means for driving said at least some of the wheels independently of driving of the carriers, carrier-driving motor means for driving the carriers and pulse-supplying means for pulsing the wheel-driving motor means while the carrier-driving motor means drives the carriers continuously, wherein the drive means is operable in either selected one of two alternative modes, in the first of which modes rotation of the carriers is restrained and the wheel-driving motor means drives wheels on at least two of said carriers and in the second of which modes the carrier-driving motor means is operable to rotate all of the carriers about their respective axes and the pulse-supplying means and the wheel-driving motor means are operable concurrently to drive intermittently at least respective wheels on two of the carriers about the axis of those wheels whilst the carriers are rotated continuously, and wherein the drive means includes means defining a plurality of alternative predetermined configurations of the wheelchair and is arranged for setting the carriers automatically in any selected one of said predetermined configurations, one of said configurations is a compact configuration, another of said predetermined configuration is an extended configuration, in the compact configuration with the wheelchair resting on a horizontal floor, at least one of said wheels on each of said front carriers engages the floor and intersects a vertical plane containing the centre of gravity of the wheelchair and, in the extended configuration of the wheelchair, with the wheelchair resting on the horizontal floor, the centre of gravity lies in a vertical plane spaced from all of said wheels on the front and rear carriers, and the control means includes a microprocessor, means for feed instructions to said microprocessor for controlling the front and rear carriers and wheels, and the configuration of the wheelchair, and a plurality of transducers for providing to the microprocessor electrical signals to enable the microprocessor to determine the angular positions of the front and rear carriers.

* * * * *